US012769743B2

(12) United States Patent
Ho et al.

(10) Patent No.: US 12,769,743 B2
(45) Date of Patent: Oct. 20, 2026

(54) SEARCH RESULT ANNOTATIONS

(71) Applicant: Google LLC, Mountain View, CA (US)

(72) Inventors: Denise Ho, Los Altos, CA (US); Grzegorz Glowaty, Kilchberg (CH); Reed Taylor, Pittsburgh, PA (US); Tom Murphy, Pittsburgh, PA (US); Juro Gottweis, Adliswil (CH)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/973,825

(22) Filed: Dec. 9, 2024

(65) Prior Publication Data

US 2025/0181590 A1 Jun. 5, 2025

Related U.S. Application Data

(63) Continuation of application No. 17/303,206, filed on May 24, 2021, now Pat. No. 12,164,527.

(60) Provisional application No. 62/705,413, filed on Jun. 25, 2020.

(51) Int. Cl.
*G06F 16/2457* (2019.01)

(52) U.S. Cl.
CPC .. *G06F 16/24573* (2019.01); *G06F 16/24578* (2019.01)

(58) Field of Classification Search
None
See application file for complete search history.

(56) References Cited

U.S. PATENT DOCUMENTS

| | | | | |
|---|---|---|---|---|
| 8,280,783 | B1 * | 10/2012 | Brownell | G06Q 30/00 705/26.7 |
| 9,239,865 | B1 | 1/2016 | Balez et al. | |
| 9,870,423 | B1 | 1/2018 | Bousquet et al. | |
| 2007/0038600 | A1 | 2/2007 | Guha | |

(Continued)

FOREIGN PATENT DOCUMENTS

| | | | |
|---|---|---|---|
| CN | 102298612 | A | 12/2011 |
| CN | 105144165 | A | 12/2015 |

OTHER PUBLICATIONS

First Office Action for Chinese Application No. 202110704878.3 (with English translation), mailed Feb. 29, 2024, 39 pages.

(Continued)

*Primary Examiner* — Kannan Shanmugasundaram
(74) *Attorney, Agent, or Firm* — Brake Hughes Bellermann LLP

(57) ABSTRACT

A flexible annotation framework normalizes auxiliary information from diverse sources, ranks the information for an individual search result, and provides a lightweight or full display of the auxiliary information in an annotation for the search result. An annotation thus displays information not typically part of the details included in the search result. An example method comprises, for at least one item in a search result page, identifying at least one annotation of a first annotation type in an annotation data store that references the item, identifying at least one annotation for a second annotation type in an annotation data store that references the item, ranking the annotation of the first annotation type and the annotation of the second annotation type and providing the highest ranked annotation as part of a search result for the item in the search result page.

18 Claims, 14 Drawing Sheets

(56) References Cited

U.S. PATENT DOCUMENTS

| | | | |
|---|---|---|---|
| 2008/0005064 A1 | 1/2008 | Sarukkai et al. | |
| 2008/0313144 A1 | 12/2008 | Huston | |
| 2009/0144264 A1* | 6/2009 | Singh | G06F 16/9558 707/999.005 |
| 2010/0153318 A1 | 6/2010 | Barzilay et al. | |
| 2010/0223261 A1 | 9/2010 | Sarkar | |
| 2011/0035350 A1 | 2/2011 | Zwol et al. | |
| 2011/0035406 A1 | 2/2011 | Petrou et al. | |
| 2013/0097143 A1* | 4/2013 | Shenoy | G06F 16/9535 707/706 |
| 2015/0066645 A1 | 3/2015 | Mahajan et al. | |
| 2015/0066646 A1 | 3/2015 | Sriharsha et al. | |
| 2015/0112981 A1 | 4/2015 | Conti et al. | |
| 2017/0249668 A1 | 8/2017 | Delort | |
| 2019/0205476 A1 | 7/2019 | Jagadeesan et al. | |
| 2020/0133967 A1 | 4/2020 | Shukla et al. | |
| 2021/0334305 A1 | 10/2021 | Thakkar et al. | |
| 2021/0382952 A1 | 12/2021 | Yates | |

OTHER PUBLICATIONS

Barron-Cedeno, “On the Use of an Intermediate Class in Boolean Crowdsourced Relevance Annotations for Learning to Rank Comments”, SIGIR ’17: Proceedings of the 40th International ACM SIGIR Conference on Research and Development in Information Retrieval, Aug. 7, 2017, pp. 1209-1212.

Wu, “Research on Emotional and Semantic Image Annotation and Retrieval”, Dissertation Submitted to Zhejiang University, Jan. 2013, 67 pages.

* cited by examiner

300

```
Annotation {
Item_ID; // Identifies the item in the first repository the annotation applies to
Type; // Annotator type, defines domain of the score
Payload; // heterogenic annotation payload (type dependent) – can have "light" and "full" data elements
Score; // score of annotation, meaningful in the context of the type of Annotation.  Could also be annotation features.
...
}
```

FIG. 3

SEARCH RESULT ANNOTATIONS

CROSS-REFERENCE TO RELATED APPLICATIONS

This application is a continuation of, and claims priority to, U.S. patent application Ser. No. 17/303,206, filed on May 24, 2021, entitled "SEARCH RESULT ANNOTATIONS", which claims priority to U.S. Provisional Patent Application No. 62/705,413, filed on Jun. 25, 2020, entitled "SEARCH RESULT ANNOTATIONS", the disclosures of which are incorporated by reference herein in their entirety.

BACKGROUND

Search engines traditionally search an item repository for items that satisfy query terms. Search engines aggregate information about responsive items and provide a search result to the query requestor. Search engines can search a primary item repository, such as documents available over the Internet, applications offered in an app store, items offered for sale in a marketplace, etc., or a combination of primary repositories. Each search result typically includes a link and a snippet describing fundamental details about the responsive item. The link may take a user to a page with more details about an item, the original document, etc. The search engine ranks the responsive items and provides a search result page, which lists several, usually highest ranked, responsive items and a few fundamental details about the items included in the search result page.

SUMMARY

Implementations provide annotations for search results in a search result page. The annotations represent auxiliary data about the search result, which is not part of the fundamental item details that are typically included in a search result. The annotations can connect the item to secondary repositories and/or data sources that help give context to an item's position in the search result page. Put another way, some annotations can provide justification for or insight into the ranking of the responsive search items. Some annotations can also provide tangential data, e.g., from a secondary source or the primary source, that may enable a user to more efficiently evaluate items in the search result page. Some implementations may include a framework that enables annotations to be obtained from one or more external sources. Implementations handle various types of annotations representing different auxiliary data. The disclosed framework may enable scoring of annotations from various sources and of various types. A machine-learned scoring algorithm may rank all obtained annotations for an item and provides one or more annotations to display as part of the search result for the item. Thus, implementations can display annotations from multiple secondary sources. Implementations may support various interfaces, providing fewer details (or "lightweight annotation") for space-constrained displays typical of smart phones or wearable devices, and providing more details (or "full annotation") for conventional displays, such as a laptop, smart television, or personal computer. In some implementations, the user interface may display a lightweight annotation initially and be configured to show a full annotation in response to a gesture or other intent from the user. In some implementations, full annotations may be provided in a result that is prominently displayed, such as in an entity view.

Implementations provide a framework that enables secondary systems/teams (e.g., for different information repositories) to contribute annotations. Implementations offer flexibility in the content of annotations. Implementations handle a variety of annotation data sources, and data sources can be expanded or contracted with little code change. In addition, implementations may provide an impartial scoring mechanism that relies on the quality of the produced annotations and prevents a particular annotation source from unfairly inflating the annotation scores. Implementations provide a solution to scoring the different types of annotations so the different types can be mixed and ranked on the search result page as well as on entity views, such as knowledge panels, knowledge boxes, etc. Some search engines use an entity view when a top search result corresponds to an entity, e.g., when there is sufficient confidence that a top result corresponds to a single entity. Implementations provide useful information, the auxiliary information, to the user browsing a search result. The use of annotations as disclosed herein results in more informed clicks, saving computing resources and user time. The use of annotations as disclosed herein may also result in fewer follow-on queries. Annotations can be contextual, adjusting to a specific query. Annotations may be universally helpful, regardless of the specific query. Annotations may be configured to make sense at rest, e.g., without the need for a click-thru, further conserving computing resources. Some annotations can have click targets to enable a user to dig deeper into the justification.

One or more of the implementations of the subject matter described herein can be implemented so as to realize one or more of the following advantages. As one example, implementations can integrate different kinds of annotations from different systems, providing a flexible, dynamic environment for providing auxiliary data. Implementations also conserve computing resources by increasing the confidence of a user in the search results presented, making it less likely that the user will submit multiple queries to arrive at a sought for answer. For example, implementations can provide auxiliary information from varying sources that support the rank of a particular item in a search result list, which can increase user confidence in the results presented. Implementations are thus directed to a framework for providing a novel interface for connecting items in a primary repository to secondary repositories that provide insight into the position of the item in a search result page.

BRIEF DESCRIPTION OF THE DRAWINGS

The details of one or more implementations are set forth in the accompanying drawings and the description below. Other features will be apparent from the description and drawings, and from the claims.

FIG. 3 illustrates an example annotation framework data structure, in accordance with some implementations.

Like reference symbols in the various drawings indicate like elements.

DETAILED DESCRIPTION

Implementations include a flexible annotation framework that normalizes auxiliary information from diverse sources, scores and ranks annotations for an individual search result, and provides an option for lightweight or full display of the information in an annotation. Disclosed implementations operate in a search engine environment, where a query engine generates a search result page. In some implementations, the search engine environment may be a marketplace environment, e.g., where items (e.g., applications, services, products), etc. are sold, downloaded, ordered, etc. However, disclosed techniques can be applied in any search domain that identifies items responsive to a query from a primary corpus or repository and provides annotations from other (i.e., secondary) sources. Examples of other search environments include travel-related searching, media searching, new home searching, entity searching, etc. Implementations provide a common framework for obtaining auxiliary information from the other sources and/or from the primary repository. Auxiliary information can be any information relevant to an item but excludes information conventionally provided in a search result for the item. For example, a marketplace search engine conventionally displays an image, title, price, overall reviews (stars) and/or shipping information in a search result. Auxiliary information displayed in an annotation excludes such primary information. The disclosed annotation framework is configured to accept annotations from external systems as well as to generate annotations from internal system sources. Implementations may enable display of lightweight and full annotations in the user interface. Implementations may provide none, one, or multiple annotations for a search item.

Figure 1:
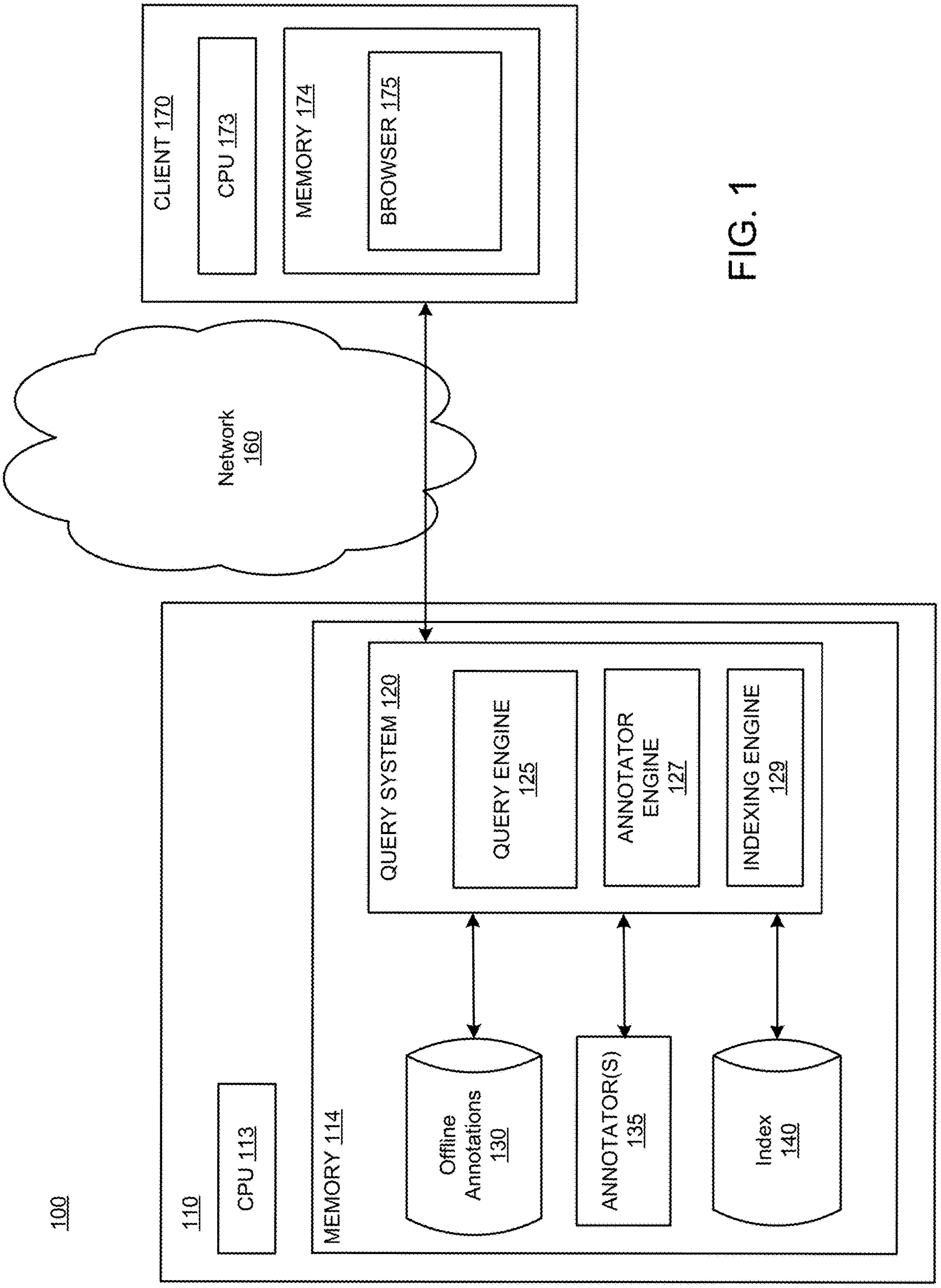
FIG. 1 illustrates an example system in accordance with some implementations.

FIG. 1 is a block diagram of a search service system 100 in accordance with an example implementation. The system 100 may be used to implement a search service that provides annotations for some search results in a search result page. For the sake of brevity, the depiction of system 100 in FIG. 1 is described as a marketplace search service, although implementations are not so limited and disclosed techniques can be applied in other settings.

Figure 12:
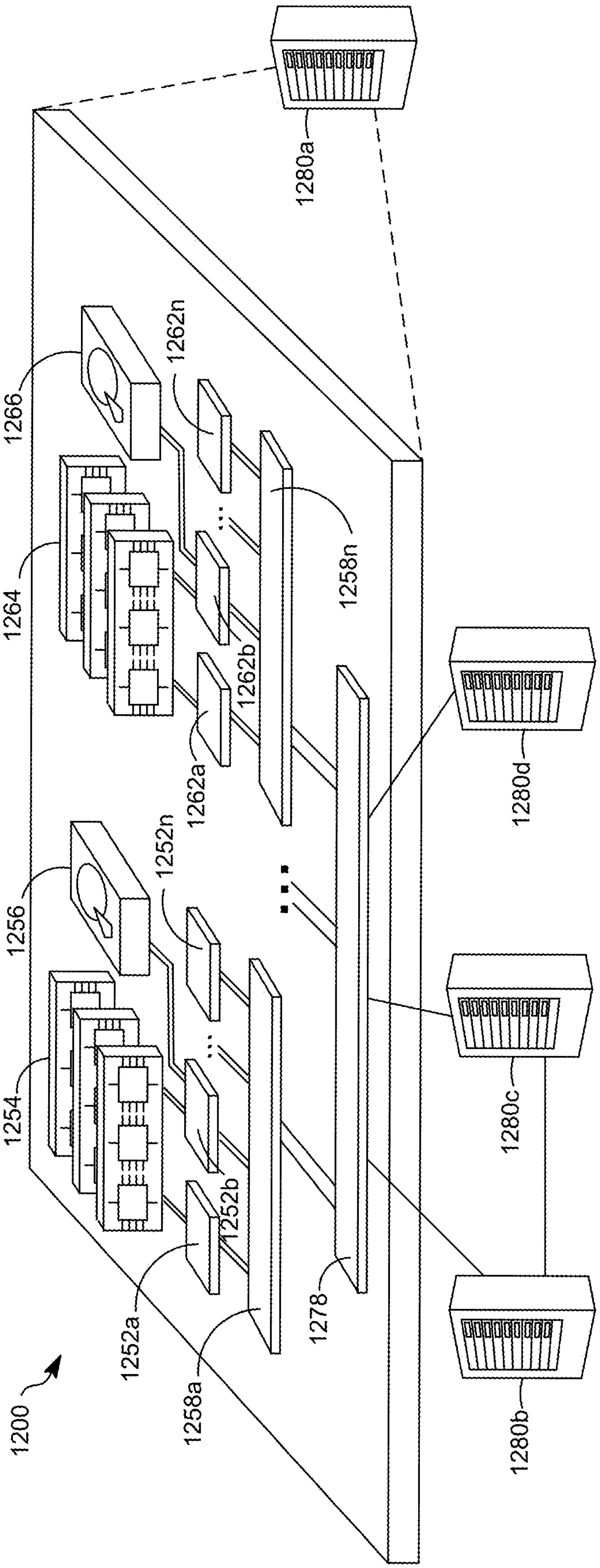
FIG. 12 shows an example of a distributed computer device that can be used to implement the described techniques.

The search service system 100 may include search engine 110. The search engine 110 may be computing devices that take the form of a number of different devices, for example a standard server, a group of such servers, or a rack server system. In some implementations, search engine 110 may be a single system sharing components such as processors and memories. In addition, search engine 110 may be implemented in a personal computer, for example a laptop computer. The search engine 110 may be an example of computer device 1200, as depicted in FIG. 12. Search engine 110 may include one or more servers that receive queries from a requestor, such as client 170 and provide search results to the requestor.

The search engine 110 may include one or more processors 113 formed in a substrate, an operating system (not shown) and one or more computer memories 114. The computer memories 114 may represent any kind of memory (e.g., RAM, flash, cache, disk, tape, etc.). The memory 114 may represent multiple kinds of memory. In some implementations (not shown) the memory 114 may include external storage, e.g., memory physically remote from but accessible by search engine 110. The search engine 110 may include one or more modules or engines representing specially programmed software. For example, the search engine may include query system 120 that enables the search engine 110 to receive and respond to queries.

The query system 120 may itself include modules. For example, the query system 120 may include a query engine 125 and an indexing engine 129. The indexing engine 129 may be configured to update index 140. For example, the indexing engine 129 may add items to index 140, update items in index 140, and delete items from index 140. In some implementations, the indexing engine 129 may work with one or more crawlers. A crawler searches for items accessible via the Internet and returns content (including metadata) for the items. In some implementations, the crawler may be configured to crawl only certain kinds of content or to crawl certain domains. The indexing engine 129 may use the content and/or metadata to generate and update the index 140.

The query system 120 may also include a query engine 125. Query engine 125 may receive queries from requestors, such as client 170, analyze the query to determine how to search index 140, and to initiate the search of the index 140. A user may submit a query, e.g., a word, a phrase, a list of words, an image, a recording etc., to search engine 110. The search engine 110, specifically the query engine 125, uses one or more indices (such as index 140) to identify items that are returned in response to the query. Items returned to the query engine 125 in response to the query may also be referred to as responsive items. The query engine 125 may generate a search result for some or all of the responsive items. As used herein, a search result is summary data relating to a responsive item. The data provided as part of the search result itself is considered primary data for the item. The primary data comes from the primary repository, e.g., index 140, and generally represents less than all data available in the repository for the item. The search result may include a link. The link may initiate some action related to the responsive item. For example, a search result link may take the user to a web page, e.g., a web page that offers the item for purchase or download, may take the user to an interface, document, or webpage that provides additional details about the item, etc. A search result for an item may also include a small image or icon relating to the item. A search result for an item may include a brief description of the item or information extracted from the item, also referred to as a snippet. A search result may include a rating summary (e.g., number of starts, a ratio, etc.) for the item. An item that is a product, service, or hotel, etc., may include a price for the item. A search result may include other summary information related to and/or describing the item as part of the primary information included in the search result.

Query engine 125 may rank the responsive items. Ranking can include applying one or more ranking signals to a responsive item. Ranking signals can include many factors. Once ranked, many search engines organize the responsive items into pages. Each page may have a pre-set number of responsive items. Thus, for example, the first ten responsive items may be returned as a first page, the next ten may be on a second page, etc. A user may use links, controls, or overscrolling to move between pages, e.g., requesting a last page, a next page, a previous page, etc. The number of responsive items returned in a first page may depend on the size of the viewable area. For example, a mobile device with a six-inch screen may include fewer responsive items in a first page than a laptop computer with a 17 inch screen.

In finding responsive items, the query system 120 may be responsible for searching one or more indices, represented collectively as index 140. The index 140 may be, e.g., an inverted index that associates terms, phrases, and/or n-grams with items. Items may be documents, including documents that describe products. The items may be products, books, applications, and/or services offered in a store. The items may be hotels, restaurants, flights, etc., related to travel. The items may be entities. The terms, phrases, and/or n-grams may be from an item description. The terms, phrases, and/or n-grams may be from reviews about an item. The terms, phrases, and/or n-grams may be from a document (web page, PDF, etc.) that describes or mentions an item. The index 140 may also include a knowledge base or knowledge graph. In a knowledge graph entities (items) are modeled as nodes and facts about the entities are modeled as attributes or labeled relationships between entities. For example, an item may be linked to one or more reviews in a graph relationship. The index 140 may also include an index of products, properties, flights, applications, etc. Where the index 140 represents several different repositories, one may be considered a primary repository searched by the query engine 125 and the indexing engine 129. The remainder may be secondary repositories used by the query system 120, e.g., for ranking or serving additional details about user-selected responsive items.

The index 140 may be stored on a tangible computer-readable storage device, for instance disk, flash, cache memory, or a combination of these, configured to store data in a semi-permanent or non-transient form. In some implementations, index 140 may be stored in a combination of various memories. The query engine 125 may obtain responsive items from the index 140, rank the responsive items, generate a search result for at least some of the responsive items, and provide the search results to the query requestor, e.g., client 170.

In addition to finding responsive items, the query system 120 may also obtain annotations for one or more of the responsive items. The annotations for a responsive item represent auxiliary data related to the item. Some annotations are query independent. Some annotations are query dependent. Some annotations may be provided by the query system 120. Some annotations may be provided by other systems. The annotations may be of different types. For example, annotations may mention annotations based on articles or other documents that mention the item, e.g., articles reviewing a product or a news article about the product. Mention annotations may be in the form of a snippet, e.g., selecting certain text from the article. Mention annotations may be in the form of a summary, e.g., with the title of the article. As another example, an annotation may be based on editorial ratings. Such ratings may be collected from certain domains, organizations, or publications. An editorial rating annotation can include one rating from one source or may include multiple ratings from multiple sources. As another example, an annotation may be a top ranked annotation. A top ranked annotation indicates that the item was ranked in a list of "top X" items in a category, e.g., "top smart phones," "top beach vacation spots," or "top gifts for father's day." As another example, an annotation may be a review annotation. A review annotation is generated from user reviews of the item. The review annotation can be a pro/con annotation that lists the most mentioned positive aspects of the item and/or the most mentioned negative aspects of the item. A review annotation may be a query-based snippet review. A majority of queries, especially for marketplace searches, include words not parsed and/or not used to find matching items. A query-based review annotation may find and display a match in a user review for those words. The query-based review annotation may, in full form, highlight (e.g., bold, underline, italicize, make a different color, etc.) the matching words.

As another example, an annotation may be a new release annotation. A new release annotation may provide an indication that the item is new, which may give it greater importance and therefore more relevance. As another example, an annotation may be a query context annotation. A query context annotation uses a query term related to measure and emphasizes the product attributes that meet those terms. In some implementations, the query context annotation may show a graph distribution over all items in the same category and pinpoint where the result appears in that space. As another example, an annotation may be a description annotation. While most search result pages do not include a long description of an item, a description annotation includes such descriptions. In some implementations the annotation may highlight or select (if the description is too long) a portion particularly relevant to the query. As another example, an annotation may be a multimedia annotation. A multimedia annotation may point to a video or audio file from an authoritative source (reputable publisher) relating to the item. The multimedia file may be a review of an item, a demonstration of the item, etc. As another example, an annotation may be a prior query annotation. A prior query annotation is an indication that the user has previously researched the item if the user has consented to keeping historical data.

Some of the annotation types may be pre-computed offline and stored, e.g., in offline annotations 130. The offline annotations may be indexed by item, e.g., by an item identifier. Annotations may be pushed to the query system 120 from other systems. Thus, for example, mention, top rated, editorial review, etc. annotation types can be pushed from an internet or news search system to a product query system and stored in offline annotations 130. In some implementations, query-dependent annotation types may be computed offline and stored in offline annotations 130. In some implementations, query dependent annotation types, such as query-based review snippets, description, or context annotations, may be generated at query time. In some implementations, all annotations from other systems are stored in offline annotations 130. In some implementations, some of the annotation types generated by the query system 120 can be computed offline and stored in offline annotations 130. In some implementations, some of the annotation types generated by the query system 120 can be computed at query time. Although illustrated as part of search engine 110, in some implementations one or more annotation types stored in offline annotations 130 are remote from, but accessible by the search engine 110.

In some implementations, the query system 120 may include search records (not shown). Search records may include aggregated search logs, aggregated data gathered from queries, or other aggregated data regarding previously processed queries. In some implementations, the search records may be generated by search engine 110 in the normal process of generating search results. In some implementations, search records may be used as a source for an annotation type.

The search engine 110 may include one or more annotators 135. In some implementations, an annotator 135 produces one type of annotation. An annotator 135 may be remote from but communicatively connected to the search engine 110. The annotator 135 is configured to generate the annotation payload from a secondary repository or from data in the primary repository not conventionally included in a search result. In some implementations, the annotator 135 may score the annotation. In some implementations, the annotator 135 may generate features that can be used to score the annotation against other annotations. In some implementations, the annotator 135 may use a machine learned model (e.g., regression algorithm, neural network, etc.) for scoring annotations. The machine learned model may be trained by providing human raters with an item and with one or more annotations of the same type for the item. The human raters may give a score to each annotation that is in indication of the usefulness of the annotation. These labeled annotations may be used to train the model or models to score annotations of a particular type. In some implementations, one or more of the annotators 135 may exist on an external system, which pushes normalized annotation information to the search engine 110. An external system may include multiple annotators 135 (e.g., for different types of annotations).

The query system 120 includes annotator engine 127. The annotator engine 127 obtains annotations from the annotators 135 for an item and aggregates the annotations. The annotator engine 127 includes a machine learned model, e.g., an NG3. The annotator engine 127 is configured to take each of the scored annotations (or scoring features) produced by the annotator 135 that created the annotation and rank the different annotations against each other. The machine learned model may be trained by presenting an item with several annotations of different types to a human rater and having the human rater rank the annotation types. This labeled data may be used to train the model. If a new type of annotation is added to the system, the model may be retrained to include the new type of annotation. Thus, new annotation types can be added to the query system 120 by retraining the annotator engine 127. In some implementations, if an annotator 135 has been found to inflate the annotation score or otherwise game the system, or if new information indicates a particular annotation type is not as useful, the annotator engine 127 may be trained to penalize the annotations of that annotation type.

Once the annotator engine 127 has ranked the annotations for an item, the annotations may be provided for presentation. The query system 120 may provide a top-ranked annotation. The query system 120 may provide a set of x top-ranked annotations. The query system 120 may provide all annotations ranked for the item. The query system can provide a lightweight or a full annotation for initial display. The lightweight annotation may be selected when screen space is at a premium. The annotations may be displayed in a carousel, a swipe-and-grow interface, an expandable row, etc. Not every search result in the search result page may have an annotation. In some implementations, only the top-ranked responsive items may have an annotation. In some implementations, if an item lacks an annotation that has a minimum score/rank, then no annotation may be displayed for that item. The query system 120 may provide information needed to display the annotations as part of the search result page for the query.

The query system 120 may be in communication with client(s) 170 over a network 160. Network 160 may be for example, the Internet, a cellular network, a wired or wireless local area network (LAN), wide area network (WAN), etc. The network 160 may represent multiple types of networks. Via the network 160, the query system 120 may communicate with and transmit data to/from clients 170 as well as with other domains (not shown).

Figure 11:
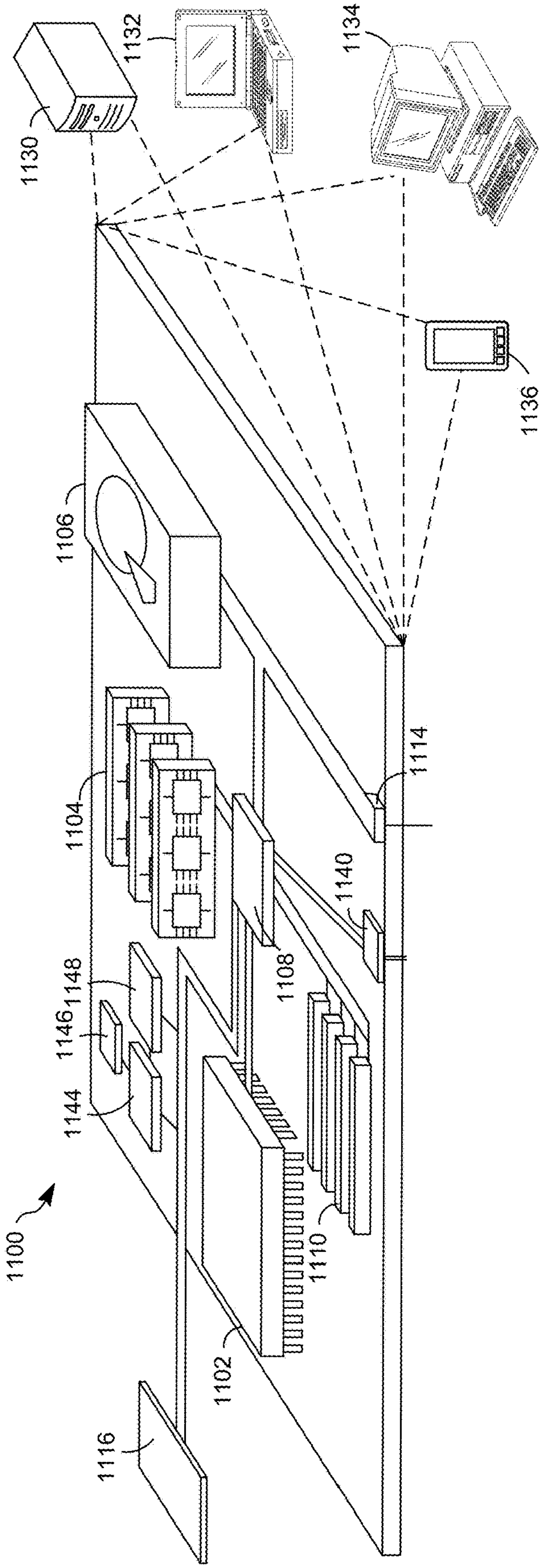
FIG. 11 shows an example of a computer device that can be used to implement the described techniques.

The client 170 may be an example of computer device 1100, as depicted in FIG. 11. For example, the client 170 may be a personal computer, a mobile phone, a tablet, a laptop, a wearable device, a smart television, or the like. Client 170 may include one or more processors 173 formed in a substrate configured to execute one or more machine executable instructions or pieces of software, firmware, or a combination thereof. The processors 173 can be semiconductor-based—that is, the processors can include semiconductor material that can perform digital logic. Client 170 can also include one or more computer memories 174. The memories 174, for example, a main memory, may be configured to store one or more pieces of data, either temporarily, permanently, semi-permanently, or a combination thereof. The memories 174 may include any type of storage device that stores information in a format that can be read and/or executed by the one or more processors 173. The memories 174 may store applications, modules and/or engines that, when executed by the one or more processors 173, perform certain operations. In some implementations, the applications, modules, or engines, may be stored in an external storage device and loaded into the memory 174.

The applications may include any number of applications configured to execute on the client 170, such as an operating system, a messaging application, shopping applications, editing applications, search assistants, maps, etc. In particular, the applications include a browser 175. The browser 175 is operable to receive web page code (e.g., HTML, JavaScript, etc.) and render the web page for presentation to a user of the client 170. The client 170 thus includes a display device with a viewport. As used herein a viewport is a polygon region displaying content rendered by a browser. Conventionally a viewport is rectangular. The size of the viewport is device dependent, e.g., a viewport on a smartphone is smaller than the viewport of a personal computer or tablet. The content of a rendered web page may not all fit in the viewport. In such an instance, the user may scroll, e.g., execute a scroll action, to bring content into the viewport and move content out of the viewport. A scroll action is any input that the browser 175 (possibly in conjunction with an operating system of client 170) recognizes as executing a scroll to move content into the viewport. Example scroll actions are actuating a wheel on a mouse, a click-and-drag action, a swipe action (e.g., using a finger or stylus), actuation of scroll bars in a browser window, etc. The browser 175 thus displays scrollable content (e.g., a rendered webpage) and the viewport determines what portion of the content the user of client 170 can actually see, or in other words what portion of the content is visible. An expansion of a lightweight annotation may scroll content previously in the viewport off of the viewport.

The client 170 may include one or more input devices, such as touch screen, keyboard, mouse, pointer, a microphone, a camera, one or more physical buttons, etc. The input devices may initiate input events, such as scrolling, link selection, cursor movement. The client 170 may also include communications devices operable to send and receive data from other computing devices, such as another client, servers, search engine 110, etc., over one or more networks, such as network 160. The configuration of FIG. 1 represents one example configuration and implementations may incorporate other configurations.

Further to the descriptions above, a user of client 170 may be provided with controls allowing the user to make an election as to both if and when systems, programs, or features described herein may enable collection of user information (e.g., information about a user's activities, a user's preferences, or a user's current location), and whether the user is sent content or communications from a server, such as search engine 110. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user of client 170 may have control over what information is collected about the user, how that information is used, and what information is provided to the user and/or to the search engine 110.

Figure 2:
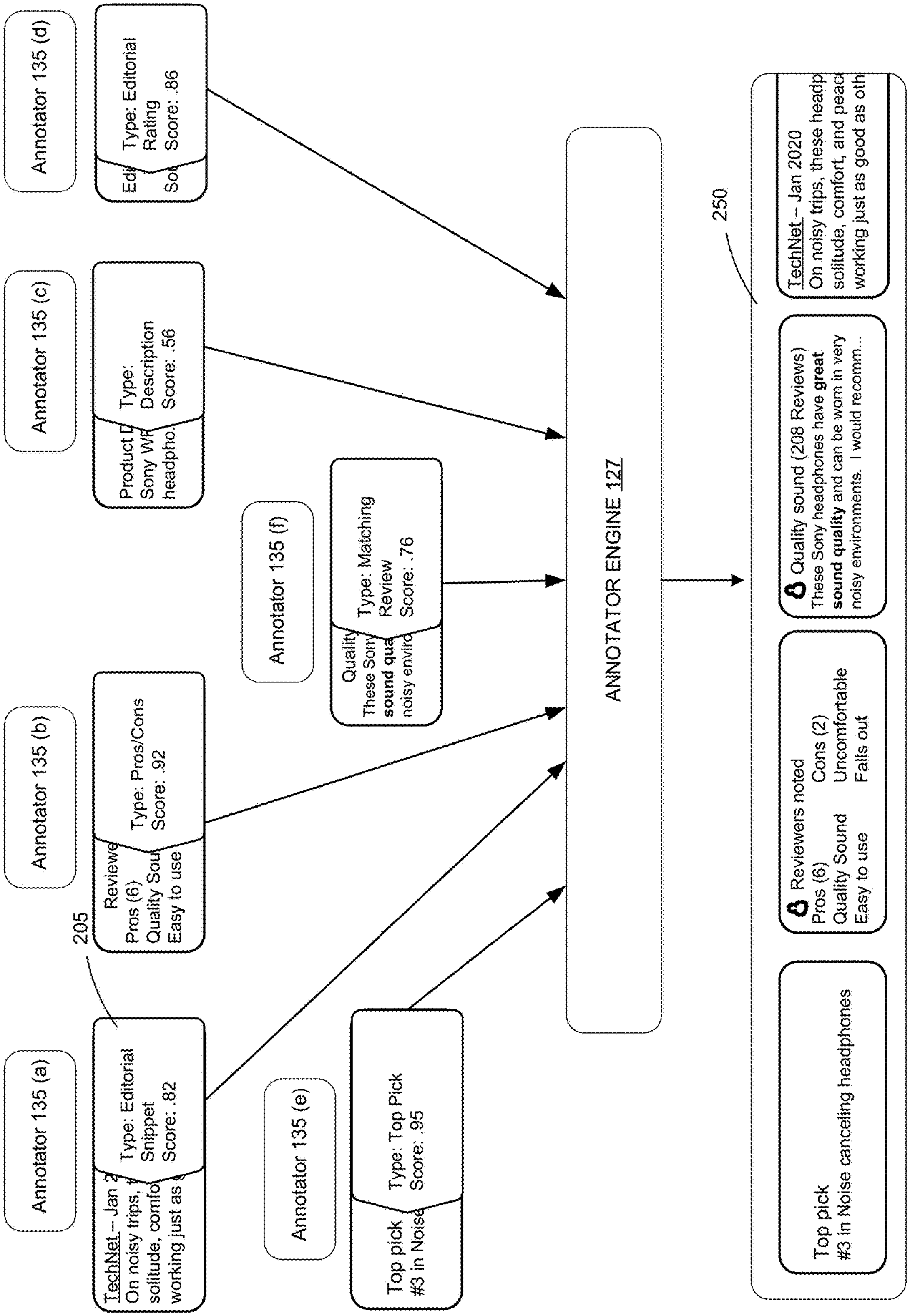
FIG. 2 illustrates an example data diagram of a diverse annotation ranking pipeline, according to an implementation.

FIG. 2 illustrates an example data diagram of a diverse annotation ranking pipeline, according to an implementation. In the example of FIG. 2, the system includes five different types of annotations. Annotator 135(*a*) produces an editorial snippet annotation. Annotator 135(*b*) produced a review pro/con annotation. Annotator 135(*c*) produces a description annotation. Annotator 135(*d*) produces an editorial rating annotation. Annotator 135(*e*) produces a top ranked annotation. Annotator 135(*f*) produces a query-based review snippet annotation. Each annotator 135 may generate the annotation in a normalized format. FIG. 3 illustrates an example normalized annotation format 300, in accordance with some implementations. The annotation may identify the item to which it applies, e.g., a document identifier, a product identifier, an entity identifier, etc. The identifier may match the identifier of the item in the primary index. The annotation may also include an indication of the type of annotation. The payload includes the data to be included in an annotation of that type. The payload is dependent on the annotation type. In some implementations, the payload may include data items for a light annotation and additional data items for a full annotation. In some implementations, the payload may include instructions (e.g., code) for how the data items are displayed. In some implementations, the payload may include a target. The target may be a document from which the annotation was generated. The annotation may include a score. The score is set annotator that generated the annotation. The annotation may include a feature set. The feature set may be used to score the annotation against annotations of the same type and/or other types.

In the example of FIG. 2, each annotator 135 provides a score for the annotation. The annotator engine 127 takes all the annotations and ranks them against each other, e.g., using a machine learned ranking algorithm. The output of the annotator engine 127 is a ranked list 250 of annotations. Example systems may select one, two, three, etc. of the annotations in the ranked list 150 to display as part of the search result.

Figure 4A:
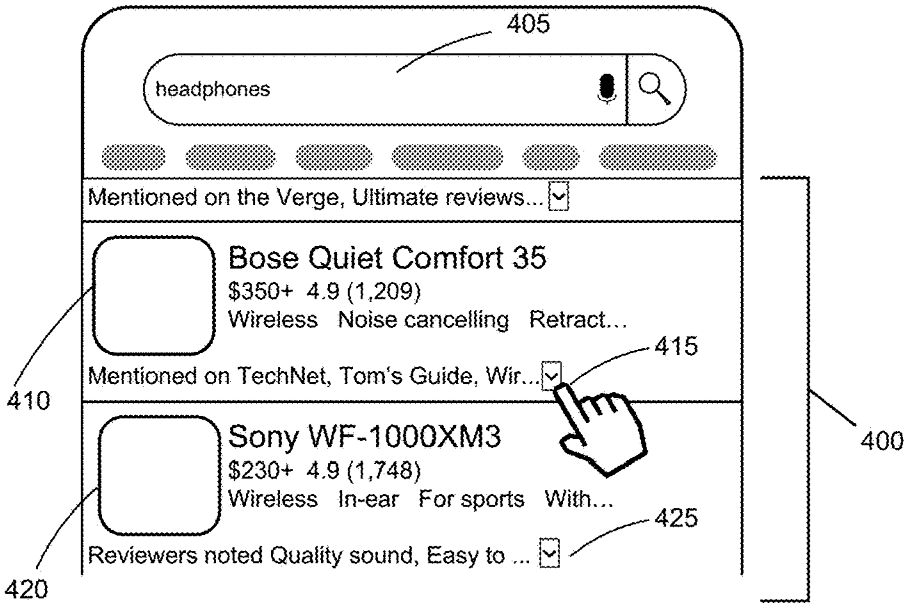
FIGS. 4A-4D illustrate example mention and review annotation types for a search result page, in accordance with some implementations.
Figure 4B:
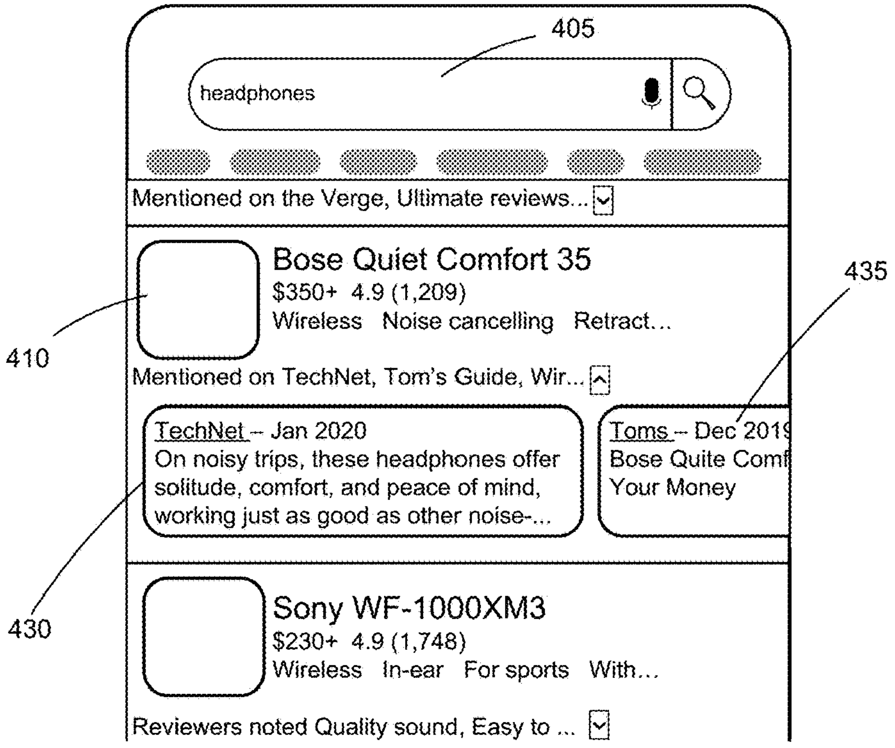

FIGS. 4A-4D illustrate example mention and review annotation types for a search result page 400, in accordance with some implementations. In the example of FIG. 4A a user has entered a query 405 of "headphones". The search results 400 for the query 405 include result 410 and result 420. Both result 410 and result 420 include annotations in the form of an expandable row. The control 415 may be selected to expand the annotations for search result 410 and the control 425 may be selected to expand the annotations for search result 420. In FIG. 4B, the user has selected the control 415. Selection of the control 415 causes the annotation 430 to be displayed in a carousel that includes annotation 435. Both annotation 430 and annotation 435 relate to the item of search result 410. Annotation 430 is an example of a mention annotation. In particular, the annotation 430 is in the form of a snippet, e.g., selecting certain text of an editorial review of the item. Annotation 435 is another mention of the item in the form of a summary, e.g., with the title of the article from a different editorial review.

Figure 4C:
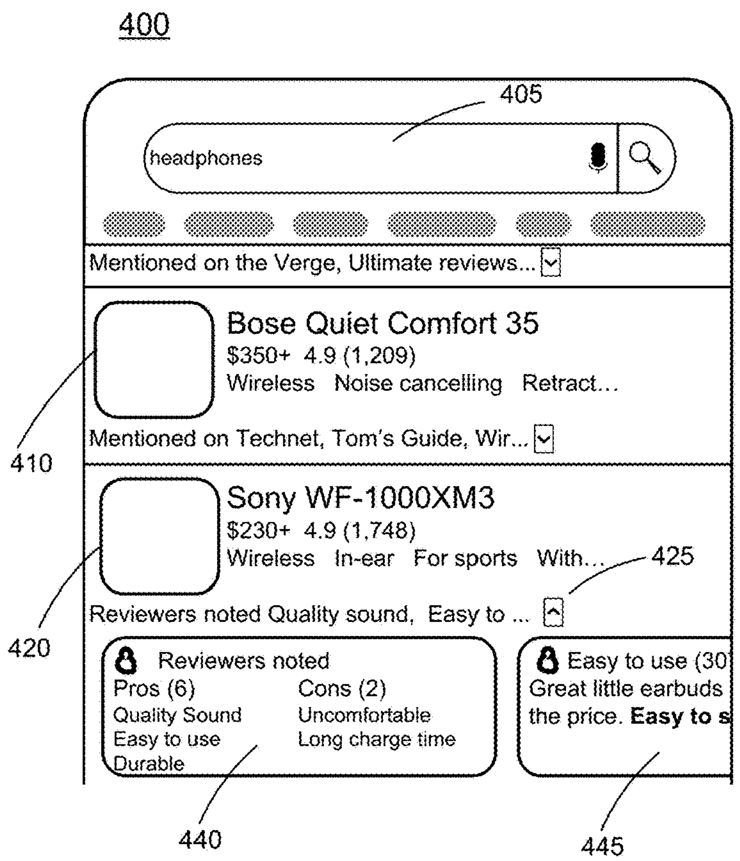
Figure 4D:
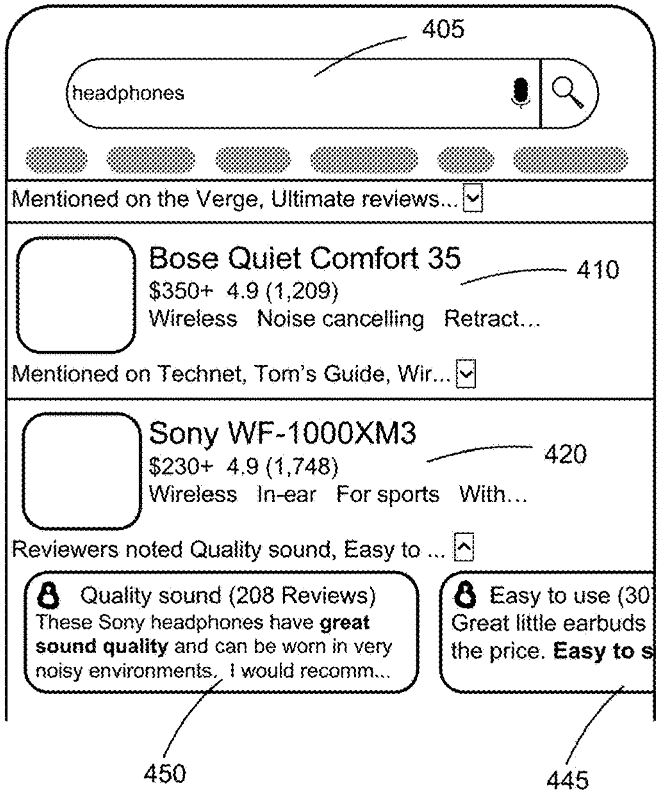

FIG. 4C results from the user selecting control 425. Selection of control 425 results in an expanded row displaying the annotation 440 and the annotation 445 in a carousel, scrollable horizontally. In some implementations, only annotation 440 may be displayed in the expanded row. In some implementations the annotation 440 may display the full annotation. Other annotations may be included in the carousel and accessed via scrolling. The annotation 440 is an example of a review pro/con annotation type. The review pro/con may be generated from user reviews for the product. The review pro/con annotation may list the most mentioned positive aspects of the item and/or the most mentioned negative aspects of the item. In some implementations, a pro/con annotation may include one or more click targets. A click target may trigger a query. The query may search reviews of that item. A click target may open a reviews view. The annotation 445 is a review snippet. A review snippet may list a review that includes one of the most mentioned pros (or cons) of the product. Annotation 450 illustrated in FIG. 4D is another example of a review snippet annotation.

Figure 5A:
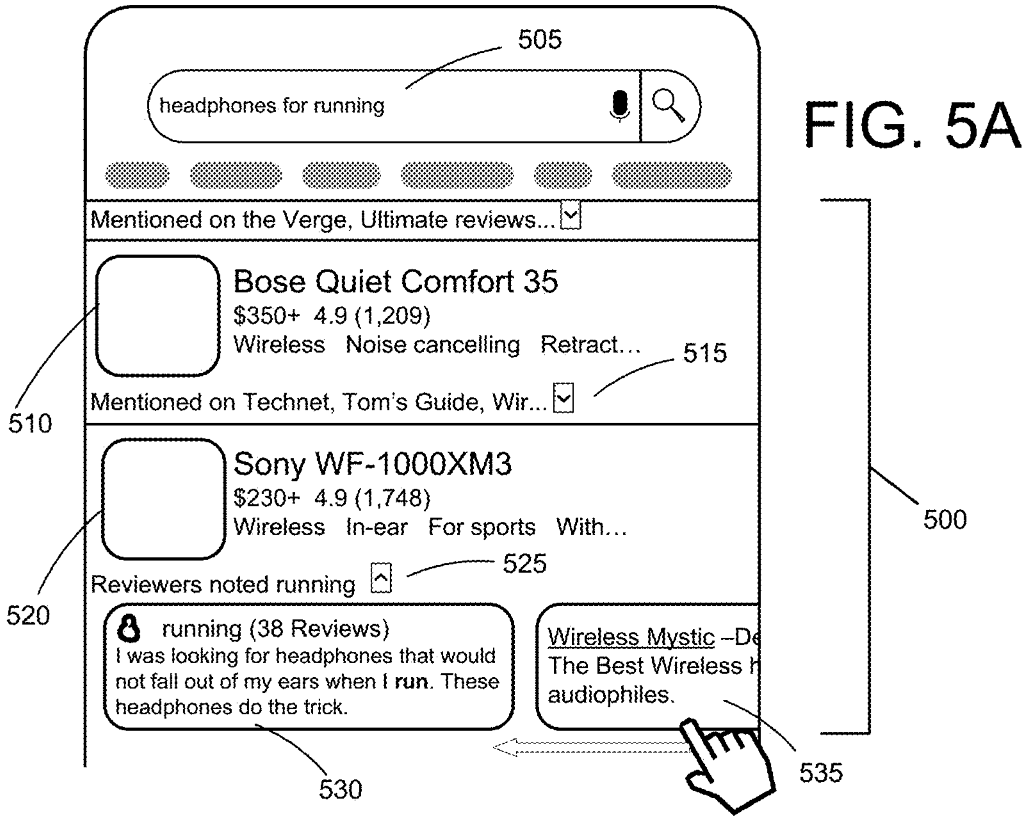
FIGS. 5A and 5B illustrate another review annotation type for a search result page, in accordance with some implementations.
Figure 5B:
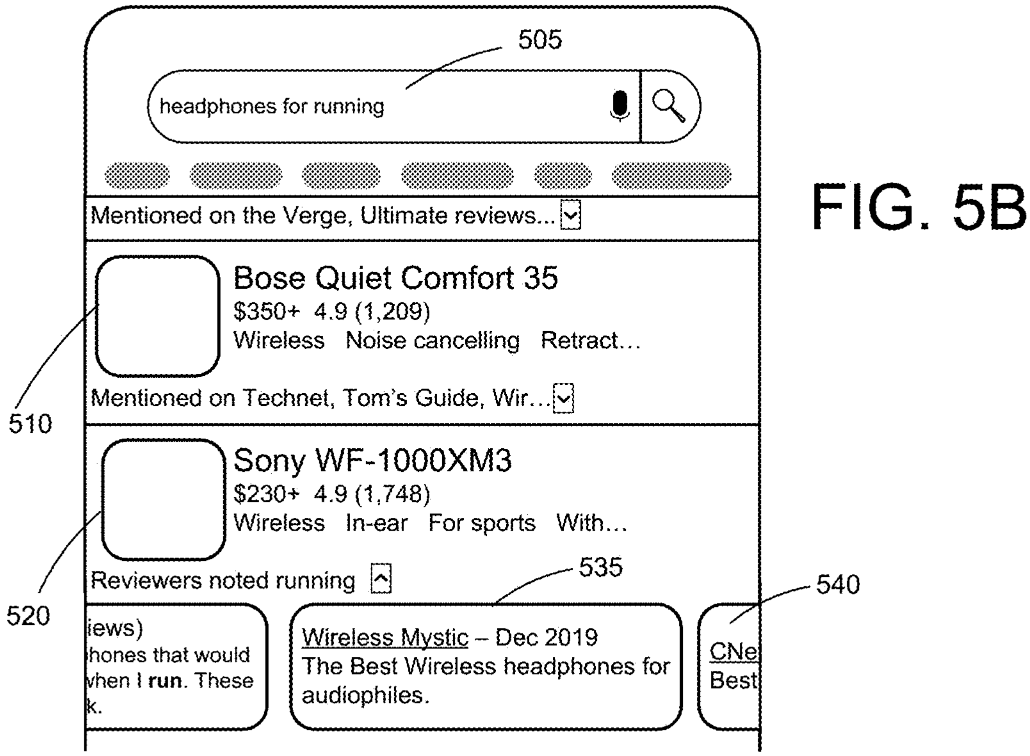

FIGS. 5A and 5B illustrate another review annotation type for a search result 500, in accordance with some implementations. In the example of FIG. 5A a user has entered a query 505 of "headphones for running". The search results 500 for the query 505 include result 510 and result 520. Both result 510 and result 520 include annotations in the form of an expandable row. The control 515 may be selected to expand the annotations for search result 510 and the control 525 may be selected to expand the annotations for search result 420. In FIG. 5A the user has selected control 525, which results in display of annotation 530 and annotation 535 in a carousel. The annotation 530 is an example of a query-based review annotation. In the example of FIG. 5A, the annotation includes a snippet of a user review that mentions running in conjunction with headphones. That users mention running in reviews for a product may result in a higher ranking for the particular product. The annotation provides justification for the rank of the search result 520 and may result in fewer follow-on queries because the user has a level of confidence that the result matches the intent. Query terms that are rare/uncommon in the primary repository (e.g., not many items associated with run or running compared with the number associated with headphones) may be used to identify appropriate review snippets. Query terms that are determined to describe an entity (an adjective for an item)

may be used to identify appropriate snippets. A portion of the review snippet that mentions the query-specific context may be highlighted (bolded, italicized, underlined, different font color, etc.). A review snippet annotation may include a click target. The click target may initiate a query of user reviews. FIG. 5B illustrates the horizontal scrolling of the carousel, which brings annotation 535 fully into the viewport and annotation 540 partially into the viewport. Annotation 535 is another example of a review mention summary.

Figure 6B:
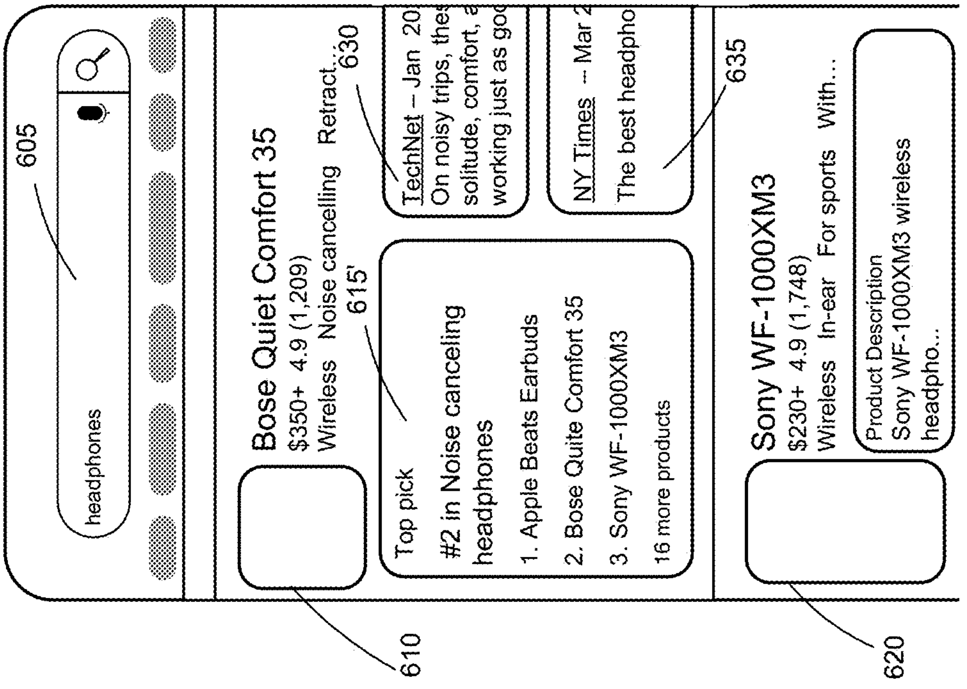
FIGS. 6A-6C illustrate example top-pick and description annotation types for a search result page, in accordance with some implementations.
Figure 6A:
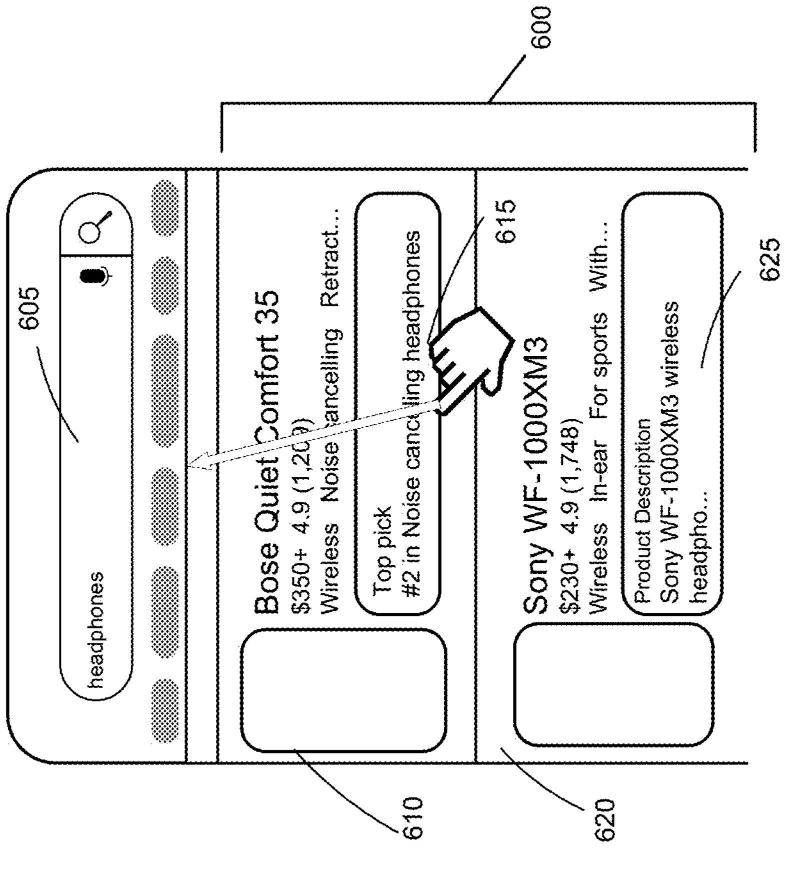
Figure 6C:
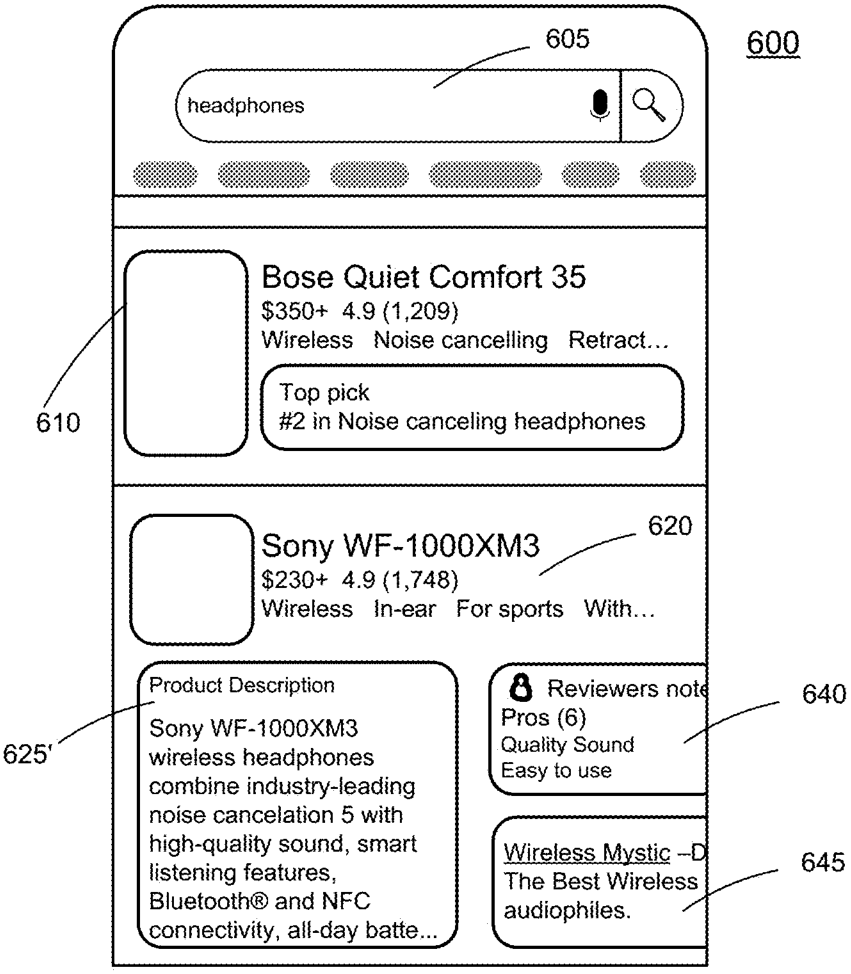

FIGS. 6A-6C illustrate example top-pick and description annotation types for a search result 600, in accordance with some implementations. In the example of FIG. 6A a user has entered a query 605 of "headphones." The search results 600 for the query 605 include result 610 and result 620. Both result 610 and result 620 include annotations in the form of a swipe-and-grow interface element. In a swipe-and-grow interface, the user can select an annotation and swipe or drag down to expand the annotations interface. A swipe of annotation 615 results in the expanded interface illustrated in FIG. 6B. The annotation 615 represents an example of a top ranked annotation type. A top-ranked annotation indicates that the item was ranked in a list of "top X" items in a category, e.g., "top smart phones," "top beach vacation spots," or "top gifts for father's day." The annotation 615 represents a lightweight version of the annotation. The annotation 615' of FIG. 6B illustrates a full annotation that may correspond to annotation 615. The full annotation 615' may include additional context and information not included in the lightweight version of annotation 615.

The expanded interface also includes annotation 630 and annotation 635 partially displayed in the viewport. The annotation 30 is an example of a mention snippet annotation type. The annotation 635 is an example of a mention summary. These additional annotations are optional and may not be displayed with annotation 615'. Additional annotations may also be included in a scrollable carousel. Annotation 625 of FIG. 6A illustrates an example description annotation. A description annotation includes a full/expanded description of the item. Description annotations may be used where the item description is not included in primary search result information. A description annotation may be contextualized to select an appropriate snippet from a longer description. A description annotation can include a click target. The click target may link to a document with a full description of the item, e.g., a product order page, a hotel booking page, a page that provided the source of the description, etc. Annotation 635 is an example of a lightweight description annotation. FIG. 6C illustrates an example of a full description annotation 635' that may correspond to annotation 635. Annotation 635' may be displayed after a swipe or short drag of annotation 635. In some implementations annotation 635' may be the only annotation displayed in the viewport. In the example of FIG. 6C, the viewport includes a carousel with additional annotations 640 and 645.

Figure 7A:
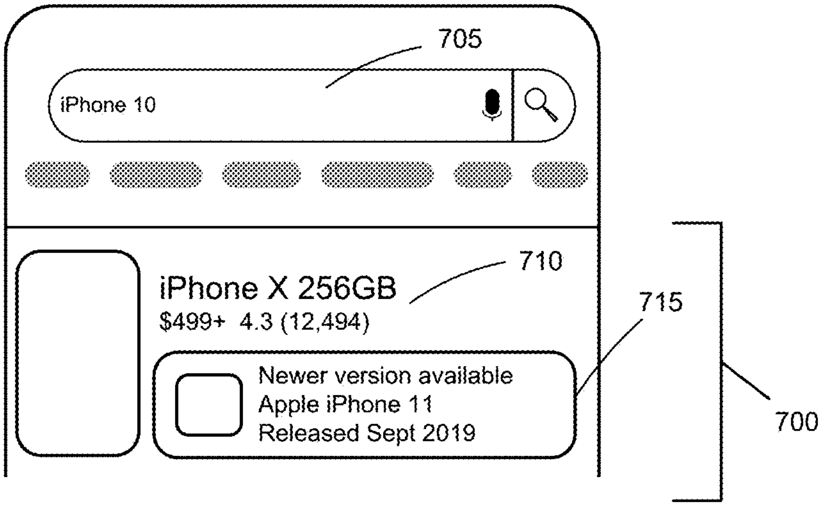
FIGS. 7A and 7B illustrate a version change annotation type for a search result page, in accordance with some implementations.
Figure 7B:
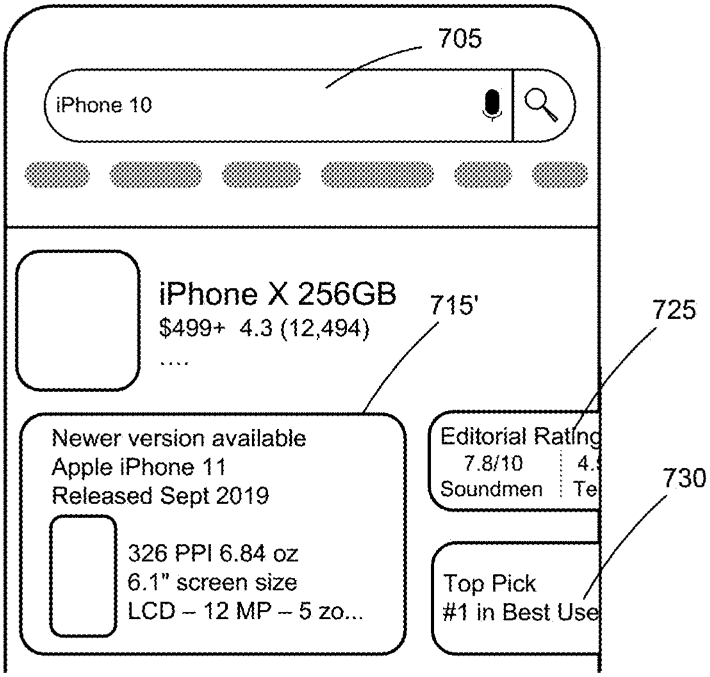

FIGS. 7A and 7B illustrate a version change annotation type for a search result 700, in accordance with some implementations. In the example of FIG. 7A a user has entered a query 705 of "iPhone 10". The search results 700 for the query 705 include result 710 and may include other results. The result 710 includes an annotation 715. The annotation 715 is an example of a version change annotation type. A version change annotation type provides the user with an indication that the item has been replaced/updated with a newer version. A version change annotation may include a name or other indication of the successor. A version change annotation may include a date of the release of the newer version. Aversion change annotation may include a click target. The click target can link to a document describing the replacement. The click target can initiate a query for the newer version of the item. Annotation 715 represents an example of a lightweight version of the version change annotation. FIG. 7B illustrates an expanded annotation interface, e.g., that results from a swipe of annotation 715. Annotation 715' represents an example of a full newer version annotation. Annotations 725 and 730 may also be displayed in the expanded annotation interface represented in FIG. 7B. Annotation 725 is an example of an editorial rating annotation. Annotation 730 is an example of a top-ranked annotation.

Figure 8A:
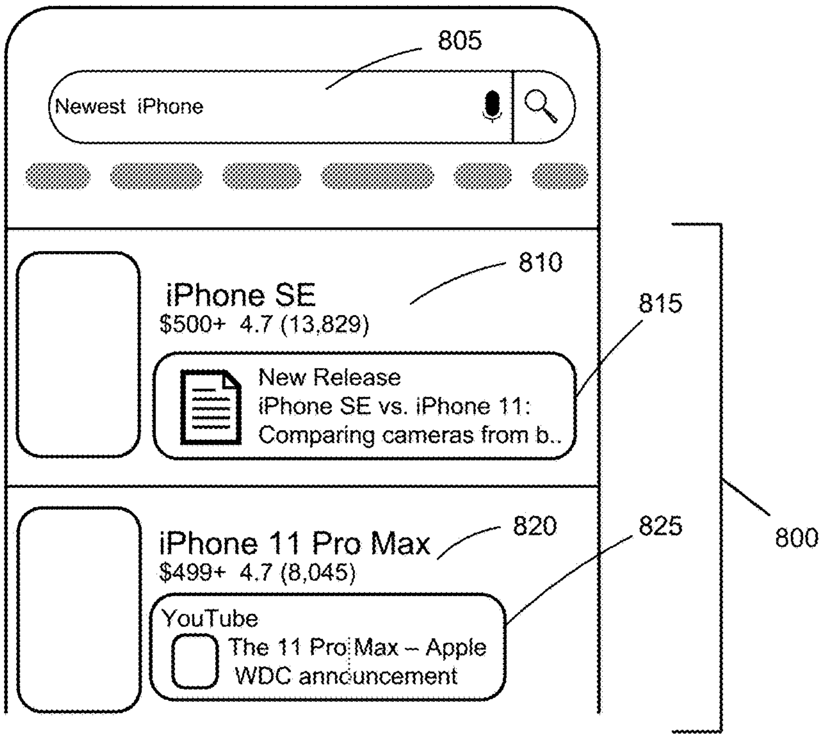
FIGS. 8A-8C illustrate example multi-media and editorial rating annotation types for a search result page, in accordance with some implementations.
Figure 8B:
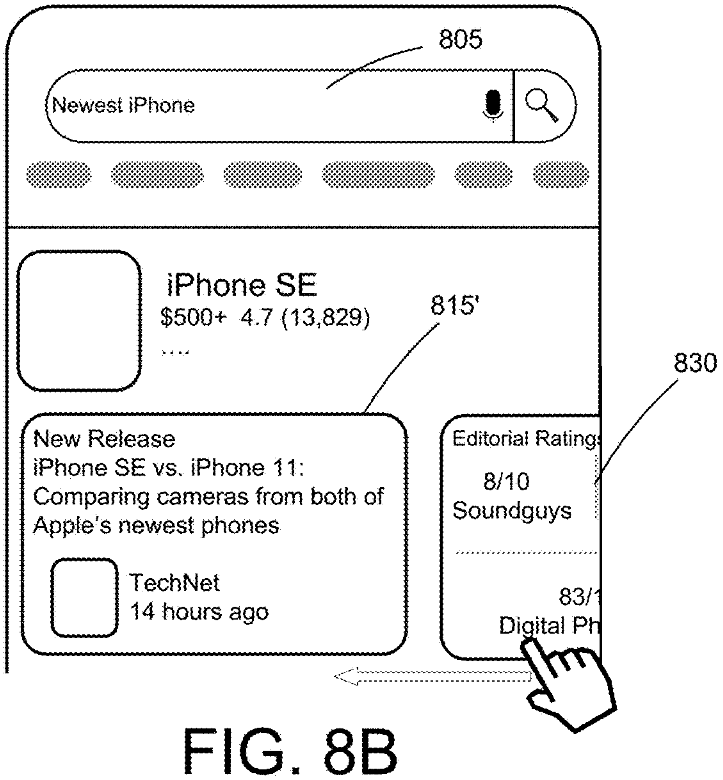
Figure 8C:
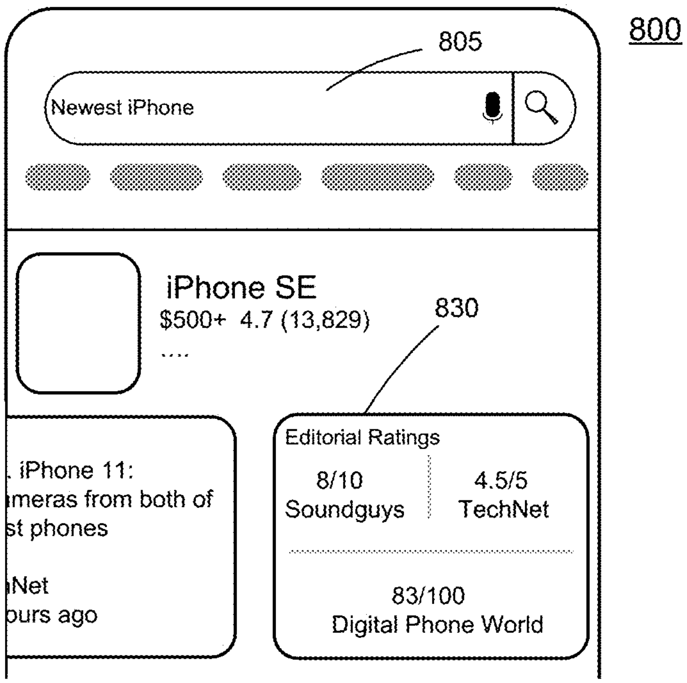

FIGS. 8A-8C illustrate example multi-media and editorial rating annotation types for a search result 800, in accordance with some implementations. In the example of FIG. 8A a user has entered a query 805 of "newest iPhone". The search results 800 for the query 805 include result 810 and result 820. The result 810 includes an annotation 815. The annotation 815 is an example of a new release annotation type. A new release annotation type may provide an indication that the item is new, which may give it greater importance and therefore more relevance to the item. The annotation 815 may represent a lightweight annotation. The annotation 825 is an example of a media annotation. A media annotation may refer to a video explaining, rating, or otherwise relating to the item. In some implementations a media annotation may be associated with curated sources, e.g., a company that sells an item or a news organization. A media annotation may include a thumbnail of the media and a title. The media annotation may include a click target. The click target may link to the media file.

FIG. 8B is an example of an expanded annotation interface resulting from a swipe-and-grow of annotation 815. The expanded annotation interface includes annotation 815', which may be an example of a full version of the annotation 815. A new release annotation may include a date of the release. A new release annotation may include a click target. The click target may be a document announcing the new release (e.g., a web page, a press release, etc.). The expanded interface also includes a partial view of annotation 830. Annotation 830 is partially displayed in the viewport and is an example of an editorial rating annotation. An editorial rating annotation can include one rating from one source or may include multiple ratings from multiple sources. In some implementations, the sources may be curated. If more than one annotation is displayed in the expanded annotation interface, the user may scroll the annotations. FIG. 8C illustrates the expanded annotation interface when the annotation 830 has been scrolled fully into the viewport. As illustrated, an editorial ratings annotation may provide a rating of the item and the source of the rating. The editorial ratings annotation can include a score for the product and a maximum score. The editorial ratings annotation can include a source of the score. The editorial ratings annotation can include a click target. The click target can be the source of the rating, e.g., a web page with details behind the rating.

Figure 9:
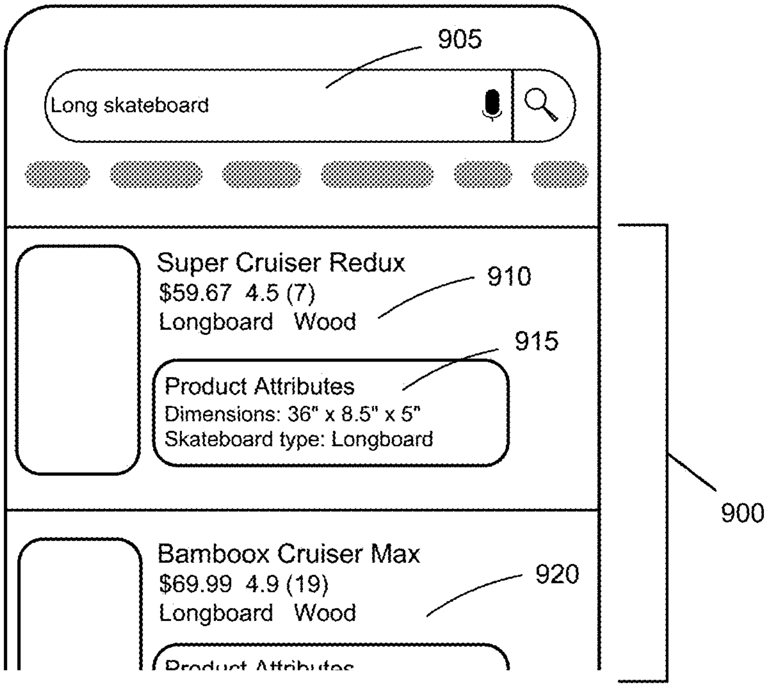
FIG. 9 illustrates a query-context annotation type for a search result page, in accordance with some implementations.

FIG. 9 illustrates a query-context annotation type for a search result 900, in accordance with some implementations. In the example of FIG. 9 a user has entered a query 905 of "long skateboard". The search results 900 for the query 905 include result 910 and result 920. The result 910 includes an annotation 915. The annotation 915 is an example of a query context annotation type. A query context annotation type may use a query term related to measure and emphasize the product attributes that meet those terms. In the example of FIG. 9, the annotation 915 includes product attributes indicating the length of the board and the type of item, which both match the description of "long" in the query 905. In some implementations, the query context annotation may show a graph distribution. The graph distribution may illustrate a distribution of the measured attribute over the entire category and may pinpoint where the item falls along the distribution.

Implementations are not limited to the example interfaces, annotations, user interactions, or usability described. Annotations can be presented in other interfaces and may include other annotation types not specifically disclosed.

Figure 10:
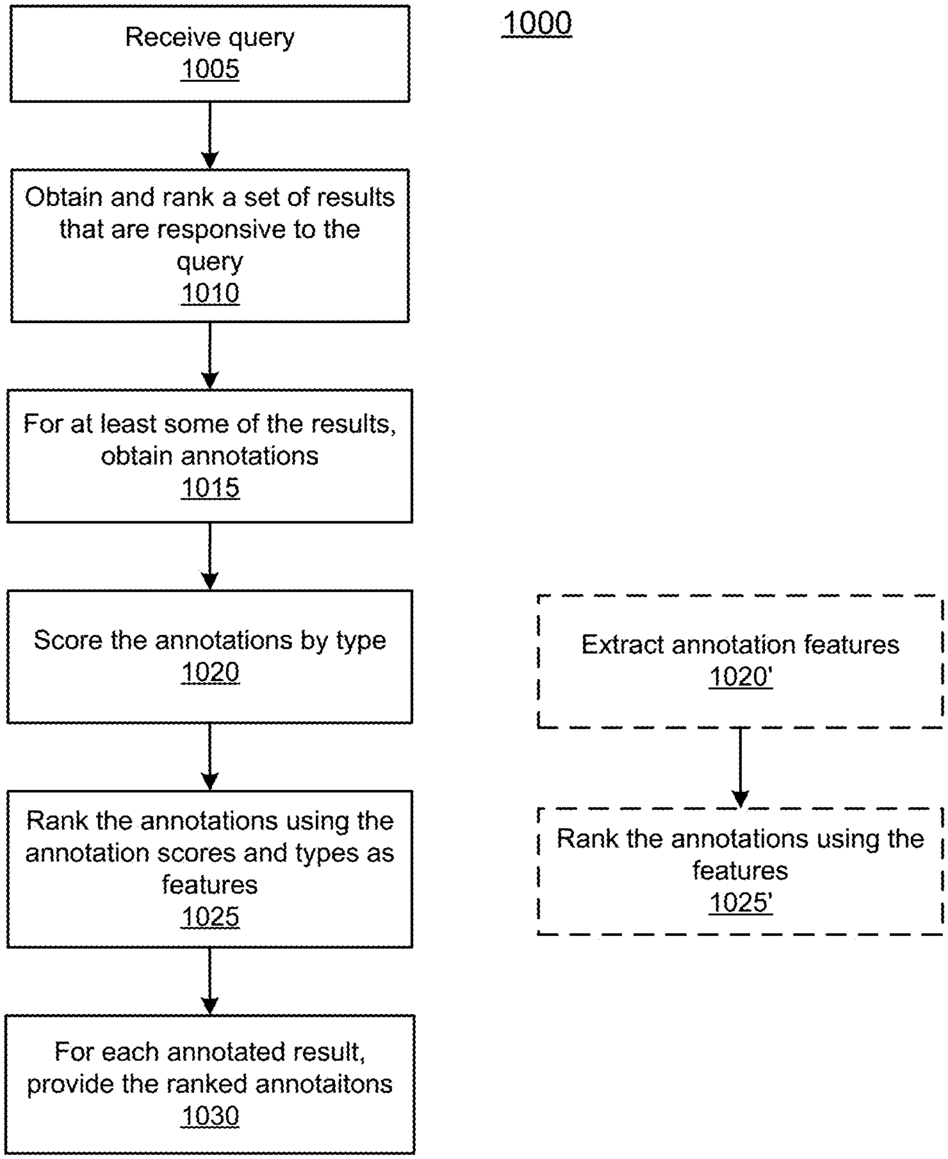
FIG. 10 illustrates a flow diagram of a process for generating dynamic annotations for a search result page, in accordance with some implementations.

FIG. 10 illustrates a flow diagram of a process 1000 for generating dynamic annotations for a search result page, in accordance with some implementations. Process 1000 may be performed by a search service system, such as system 100 of FIG. 1. Process 1000 may be one process performed during a browsing session. Process 1000 may begin in response to receiving a query from a requestor, e.g., from a client device (1005). The system may obtain and rank items from primary repositories that are considered responsive to the query, or in other words a set of responsive items (1010). The system may assign responsive items to a page, e.g., a first page, a second page. The search system may generate a search result for each responsive item assigned to the first page. The search system may also obtain annotations for at least some of the responsive items assigned to the first page (1015). A responsive item assigned to the first page may not have suggested content if, for example, the item is not associated with any pre-computed annotations or any dynamically generated annotations. The annotations may have annotation-type scores (1020). The scores are generated by the annotator that generate the annotation. The scores may be pushed with the annotation from an external system. Such annotations are pre-computed for items. The scores may be dynamically generated by the search system, e.g., from information in the primary repository using auxiliary information for an item. Dynamic annotations are still scored by the annotator. In some implementations, the annotators extract features used for scoring, rather than generating the score (1020'). The annotation(s) associated with the responsive item are ranked using the annotation scores and annotation types (1025). Alternatively, the annotation(s) associated with the responsive item are ranked using the extracted annotation features and annotation types (1025'). The system uses the ranking to provide one or more of the annotations with the responsive item (1030). In some implementations, if a top-ranked annotation does not meet a minimum score no annotation is provided. In some implementations, only a top-ranked annotation is provided. In some implementations, all annotations meeting a minimum score are provided. In some implementations, all annotations are provided and the ranking is used only to determine an order of the annotations. Process 1000 then ends.

FIG. 11 shows an example of a generic computer device 1100, which may be operated as search engine 110 and/or client 170 of FIG. 1, which may be used with the techniques described here. Computing device 1100 is intended to represent various example forms of computing devices, such as laptops, desktops, workstations, personal digital assistants, cellular telephones, smartphones, tablets, televisions, servers, and other computing devices, including wearable devices. The components shown here, their connections and relationships, and their functions, are meant to be examples only, and are not meant to limit implementations of the inventions described and/or claimed in this document.

Computing device 1100 includes a processor 1102, memory 1104, a storage device 1106, and expansion ports 1110 connected via an interface 1108. In some implementations, computing device 1100 may include transceiver 1146, communication interface 1144, and a GPS (Global Positioning System) receiver module 1148, among other components, such as a camera or cameras, touch sensors, keyboards, etc., connected via interface 1108. Device 1100 may communicate wirelessly through communication interface 1144, which may include digital signal processing circuitry where necessary. Each of the components 1102, 1104, 1106, 1108, 1110, 1140, 1144, 1146, and 1148 may be mounted on a common motherboard or in other manners as appropriate.

The processor 1102 can process instructions for execution within the computing device 1100, including instructions stored in the memory 1104 or on the storage device 1106 to display graphical information for a GUI on an external input/output device, such as display 1116. Display 1116 may be a monitor or a flat touchscreen display. In some implementations, multiple processors and/or multiple buses may be used, as appropriate, along with multiple memories and types of memory. Also, multiple computing devices 1100 may be connected, with each device providing portions of the necessary operations (e.g., as a server bank, a group of blade servers, or a multi-processor system).

The memory 1104 stores information within the computing device 1100. In one implementation, the memory 1104 is a volatile memory unit or units. In another implementation, the memory 1104 is a non-volatile memory unit or units. The memory 1104 may also be another form of computer-readable medium, such as a magnetic or optical disk. In some implementations, the memory 1104 may include expansion memory provided through an expansion interface.

The storage device 1106 is capable of providing mass storage for the computing device 1100. In one implementation, the storage device 1106 may be or include a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in such a computer-readable medium. The computer program product may also include instructions that, when executed, perform one or more methods, such as those described above. The computer- or machine-readable medium is a storage device such as the memory 1104, the storage device 1106, or memory on processor 1102.

The interface 1108 may be a high-speed controller that manages bandwidth-intensive operations for the computing device 1100 or a low speed controller that manages lower bandwidth-intensive operations, or a combination of such controllers. An external interface 1140 may be provided so as to enable near area communication of device 1100 with other devices. In some implementations, controller 408 may be coupled to storage device 1106 and expansion port 1114. The expansion port, which may include various communication ports (e.g., USB, Bluetooth, Ethernet, wireless Ethernet) may be coupled to one or more input/output devices, such as a keyboard, a pointing device, a scanner, a camera or cameras, or a networking device such as a switch or router, e.g., through a network adapter.

The computing device 1100 may be implemented in a number of different forms, as shown in the figure. For example, it may be implemented as a standard server 1130, or multiple times in a group of such servers. It may also be implemented as part of a rack server system. In addition, it may be implemented in a computing device, such as a laptop computer 1132, personal computer 1134, or tablet/smart phone 1136. An entire system may be made up of multiple computing devices 1100 communicating with each other. Other configurations are possible.

FIG. 11 shows an example of a generic computer device 1100, which may be search engine 110 of FIG. 1, which may be used with the techniques described here. Computing device 1100 is intended to represent various example forms of large-scale data processing devices, such as servers, blade servers, datacenters, mainframes, and other large-scale computing devices. Computing device 1100 may be a distributed system having multiple processors, possibly including network attached storage nodes, that are interconnected by one or more communication networks. The components shown here, their connections and relationships, and their functions, are meant to be examples only, and are not meant to limit implementations of the inventions described and/or claimed in this document.

Distributed computing system 1100 may include any number of computing devices 1180. Computing devices 1180 may include a server or rack servers, mainframes, etc. communicating over a local or wide-area network, dedicated optical links, modems, bridges, routers, switches, wired or wireless networks, etc.

In some implementations, each computing device may include multiple racks. For example, computing device 1180*a* includes multiple racks 1158*a*-1158*n*. Each rack may include one or more processors, such as processors 1152*a*-1152*n* and 1162*a*-1162*n*. The processors may include data processors, network attached storage devices, and other computer controlled devices. In some implementations, one processor may operate as a master processor and control the scheduling and data distribution tasks. Processors may be interconnected through one or more rack switches 1158, and one or more racks may be connected through switch 1178. Switch 1178 may handle communications between multiple connected computing devices 1100.

Each rack may include memory, such as memory 1154 and memory 1164, and storage, such as 1156 and 1166. Storage 1156 and 1166 may provide mass storage and may include volatile or non-volatile storage, such as network-attached disks, floppy disks, hard disks, optical disks, tapes, flash memory or other similar solid state memory devices, or an array of devices, including devices in a storage area network or other configurations. Storage 1156 or 1166 may be shared between multiple processors, multiple racks, or multiple computing devices and may include a computer-readable medium storing instructions executable by one or more of the processors. Memory 1154 and 1164 may include, e.g., volatile memory unit or units, a non-volatile memory unit or units, and/or other forms of computer-readable media, such as a magnetic or optical disks, flash memory, cache, Random Access Memory (RAM), Read Only Memory (ROM), and combinations thereof. Memory, such as memory 1154 may also be shared between processors 1152*a*-1152*n*. Data structures, such as an index, may be stored, for example, across storage 1156 and memory 1154. Computing device 1100 may include other components not shown, such as controllers, buses, input/output devices, communications modules, etc.

An entire system may be made up of multiple computing devices 1100 communicating with each other. For example, device 1180*a* may communicate with devices 1180*b*, 1180*c*, and 1180*d*, and these may collectively be known as search engine 110. As another example, search engine 110 of FIG. 1 may include two or more computing devices 1100. Some of the computing devices may be located geographically close to each other, and others may be located geographically distant. The layout of system 1100 is an example only and the system may take on other layouts or configurations.

According to certain aspects of the disclosure, a method comprises, for at least one item in a search result page, identifying at least one annotation of a first annotation type in an annotation data store that references the item, identifying at least one annotation for a second annotation type in an annotation data store that references the item, ranking the annotation of the first annotation type and the annotation of the second annotation type and providing the highest ranked annotation as part of a search result for the item in the search result page.

These and other aspects may include one or more of the following, alone or in combination. For example, the first annotation type may be a query-dependent annotation. As another example, the first annotation type may be received from an external system. As another example, the annotation data store may receive annotations from external systems in a normalized format. In some such implementations, the normalized format may include an item identifier, a payload, and a score or features used in ranking annotations of different types. As another example, the first annotation type may relate to user reviews of the item. As another example, the first annotation may include information not available in a repository used to produce the first search result. In some such implementations, the first annotation may be pushed to a system that generated the search result page from a system remote from the system that generated the search result page. As another example, a machine-learned scoring algorithm may be trained to rank annotations of different types performs the ranking.

According to certain aspects, a system includes at least one processor and an offline annotation data store storing annotations in a normalized format, each annotation being one of a plurality of annotation types, the normalized format including an item identifier. The system may also include memory storing instructions that, when executed by the at least one processor, cause the system to perform operations. The operations may include identifying annotations from the offline annotation data store that correspond to an item in a search result page, ranking the identified annotations, and providing at least a highest ranked annotation as part of the search result page.

These and other aspects can include one or more of the following, alone or in combination. For example, the highest ranked annotation may be initially displayed as a lightweight annotation. As another example, the annotation may relate to an editorial document that mentions the item. As another example the item may be a product and at least one annotation relates to a newer version of the product. As another example, at least one annotation may relate to pros and cons from user reviews of the item. As another example, the operations may also include determining a term in a query for which the search result page is generated is an adjective for the item, identifying user reviews for the item that relate to the adjective and generating at least one annotation that includes at least one of the identified user reviews. At least one annotation may be included in the ranking.

In another aspect a tangible computer-readable storage medium having recorded and embodied thereon instructions that, when executed by one or more processors of a computer system, cause the computer system to perform any of the methods or operations previously described.

Various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" "computer-readable medium" refers to any non-transitory computer program product, apparatus and/or device (e.g., magnetic discs, optical disks, memory (including Read Access Memory), Programmable Logic Devices (PLDs)) used to provide machine instructions and/or data to a programmable processor.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:

generating a response to a query from information associated with a primary source;

generating a first annotation and a second annotation from a domain distinct from the primary source, the first annotation including a first snippet of text from a first resource associated with the domain and the second annotation including a second snippet of text from a second resource associated with the domain;

providing a search result for the query that includes the response, the first annotation and the second annotation; and causing the search result to be displayed, the search result displaying the first annotation and the second annotation in a carousel interface and the search result including a first control identifying the domain and a second control identifying the domain, the first control displaying the first annotation and being selectable to navigate to the first resource and the second control displaying the second annotation and being selectable to navigate to the second resource, the first resource being different from the second resource.

2. The method of claim 1, wherein the domain is associated with an icon and providing the search result includes providing the icon for display with the first annotation and the second annotation.

3. The method of claim 1, wherein the domain is associated with a domain name and providing the search result includes providing the domain name for display with the first annotation and the second annotation.

4. The method of claim 1, further comprising:

generating a third annotation from the domain; and ranking the third annotation with respect to the first annotation and the second annotation, wherein the search result provided does not include the third annotation based on a rank of the third annotation with respect to the first annotation and the second annotation.

5. The method of claim 1, further comprising:

generating a third annotation including a summary, wherein causing the search result to be displayed further includes displaying the third annotation.

6. A non-transitory computer-readable medium storing instructions that, when executed by a processor, cause the processor to:

generate a response to a query from information associated with a primary source;

generate a first annotation and a second annotation from a domain distinct from the primary source, the first annotation including a first snippet of text from a first resource associated with the domain and the second annotation including a second snippet of text from a second resource associated with the domain;

provide a search result for the query that includes the response, the first annotation and the second annotation; and cause the search result to be displayed, the search result displaying the first annotation and the second annotation in a carousel interface and the search result including a first control and a second control identifying the domain, the first control displaying the first annotation and being selectable to navigate to the first resource and the second control displaying the second annotation and being selectable to navigate to the second resource, the first resource being different from the second resource.

7. The non-transitory computer-readable medium of claim 6, wherein the domain is associated with a domain name and providing the search result includes providing the domain name for display with the first annotation and the second annotation.

8. The non-transitory computer-readable medium of claim 6 further storing instructions that, when executed by the processor, further cause the processor to:

generate a third annotation including a summary, wherein causing the search result to be displayed further includes displaying the third annotation.

9. A method comprising:

receiving a query that identifies a category;

generating a response to the query from information associated with a primary source, the response identifying a first item and a second item in the category;

generating a first annotation for the response from a first source distinct from the primary source, the first annotation representing a first webpage where the first item is identified in a first list of two or more top-ranked items in the category, the first annotation including a title of the first webpage and a link to the first webpage;

generating a second annotation for the response from a second source distinct from the primary source and the first source, the second annotation representing a second webpage where the second item is identified in a second list of top-ranked items in the category; and providing a search result for the query that includes the response, the first annotation, and the second annotation.

10. The method of claim 9, wherein the first annotation is displayed in a first control selectable to display the first webpage and the second annotation is displayed in a second control selectable to display the second webpage.

11. The method of claim 9, wherein the first annotation includes a first control selectable to display the first webpage and the second annotation includes a second control selectable to display the second webpage.

12. The method of claim 9, wherein the first webpage is associated with an icon and providing the search result includes providing the icon for display with the first annotation.

13. The method of claim 9, wherein the first webpage is associated with a domain name and providing the search result includes providing the domain name for display with the first annotation.

14. The method of claim 9, further comprising:

generating a third annotation from a third source distinct from the primary source, the first source, and the second source, the third annotation representing a third webpage where the first item or the second item is identified in a third list of top-ranked items in the category; and including the third annotation in the search result.

15. The method of claim 9, wherein the first annotation includes an image of the first item and the second annotation includes an image of the second item.

16. A non-transitory computer-readable medium storing instructions that, when executed by a processor, cause the processor to:

receive a query that identifies a category;

generate a response to the query from information associated with a primary source, the response identifying a first item and a second item in the category;

generate a first annotation for the response from a first source distinct from the primary source, the first annotation representing a first webpage where the first item is identified in a first list of two or more top-ranked items in the category, the first annotation including a title of the first webpage and a link to the first webpage;

generate a second annotation for the response from a second resource distinct from the primary source and the first source, the second annotation representing a second webpage where the second item is identified in a second list of top-ranked items in the category; and provide a search result for the query that includes the response, the first annotation, and the second annotation.

17. The non-transitory computer-readable medium of claim 16, wherein the first annotation is displayed in a first control selectable to display the first webpage and the second annotation is displayed in a second control selectable to display the second webpage.

18. The non-transitory computer-readable medium of claim 16, wherein the first webpage is associated with an icon and providing the search result includes providing the icon for display with the first annotation.

* * * * *